US012580437B2

(12) United States Patent
Lang et al.

(10) Patent No.: US 12,580,437 B2
(45) Date of Patent: Mar. 17, 2026

(54) POWDER COATING FORMULATION FOR AN INSULATION SYSTEM OF AN ELECTRIC MACHINE

(71) Applicant: Siemens Aktiengesellschaft, Munich (DE)

(72) Inventors: Steffen Lang, Hallerndorf (DE); Marek Maleika, Fürth (DE); Jürgen Huber, Erlangen (DE); Lisa Sponsel, Bubenreuth (DE)

(73) Assignee: INNOMOTICS GMBH, Nuremberg (DE)

( * ) Notice: Subject to any disclaimer, the term of this patent is extended or adjusted under 35 U.S.C. 154(b) by 220 days.

(21) Appl. No.: 18/043,654

(22) PCT Filed: Aug. 26, 2021

(86) PCT No.: PCT/EP2021/073655
§ 371 (c)(1),
(2) Date: Mar. 1, 2023

(87) PCT Pub. No.: WO2022/048992
PCT Pub. Date: Mar. 10, 2022

(65) Prior Publication Data
US 2023/0318384 A1 Oct. 5, 2023

(30) Foreign Application Priority Data
Sep. 3, 2020 (DE) ...................... 10 2020 211 111.1

(51) Int. Cl.
*H02K 3/40* (2006.01)
*H01B 3/00* (2006.01)
(Continued)

(52) U.S. Cl.
CPC ............... *H02K 3/40* (2013.01); *H01B 3/002* (2013.01); *H02K 3/30* (2013.01); *H02K 15/105* (2013.01)

(58) Field of Classification Search
CPC ............ H02K 3/30; H02K 15/12; H02K 3/40; H02K 15/105; H01B 3/002; H01B 3/006
See application file for complete search history.

(56) References Cited

U.S. PATENT DOCUMENTS 6,288,341 B1 * 9/2001 Tsunoda .................. H02K 3/40 174/120 SR
6,359,232 B1 * 3/2002 Markovitz .............. H01B 3/04 174/209
(Continued)

FOREIGN PATENT DOCUMENTS

CN 105542629 A 5/2016 ........... C09D 167/00
CN 108300148 A 7/2018 ........... C09D 163/00
(Continued)

OTHER PUBLICATIONS

German Office Action, Application No. 102020211111.1, 4 pages, Mar. 4, 2021.
(Continued)

*Primary Examiner* — Leda T Pham
(74) *Attorney, Agent, or Firm* — Slayden Grubert Beard PLLC

(57) ABSTRACT

Various applications of the teachings of the present disclosure include a powder coating formulation suitable for producing an insulation system of an electrical machine. The formulation may include: a curable resin mixture; and spherical $SiO_2$ filler particles having a maximum particle diameter of 100 μm.

13 Claims, 2 Drawing Sheets

(51) Int. Cl.

| | |
|---|---|
| ***H02K 3/30*** | (2006.01) |
| ***H02K 15/10*** | (2006.01) |

(56) References Cited

U.S. PATENT DOCUMENTS

| | | | | |
|---|---|---|---|---|
| 10,351,728 | B2 * | 7/2019 | Takahara | H01L 23/4334 |
| 2002/0123602 | A1 | 9/2002 | Murata et al. | 528/87 |
| 2004/0241443 | A1 | 12/2004 | Decker et al. | 428/402 |
| 2013/0172473 | A1 | 7/2013 | Rathschlag et al. | 524/513 |
| 2018/0079911 | A1 * | 3/2018 | Toyoda | C09D 5/032 |

FOREIGN PATENT DOCUMENTS

| | | | |
|---|---|---|---|
| DE | 10 2009 039457 | 3/2011 | H01B 3/22 |
| EA | 001505 B1 | 4/2001 | A61K 8/11 |
| EP | 1 220 240 | 7/2002 | H01B 17/60 |
| GB | 1 424 984 | 2/1976 | H01F 27/08 |
| JP | 2010001342 A | 1/2010 | C09D 133/00 |
| RU | 2333926 C2 | 9/2008 | B32B 9/00 |
| RU | 2590541 C2 | 7/2016 | C09B 67/02 |
| WO | 2004/076572 A1 | 9/2004 | B32B 9/00 |

OTHER PUBLICATIONS

Knunyants, I.L., “Chemical Encyclopedia,” Soviet Encyclopedia, Publisher, Moscow, vol. 2, 7 pages (Russian w/ English translation), 1990.

Edited by Zezin, A.B., “High Molecular Connection,” Textbook and Workshop for Academic Bachelor’s Degree, Moscow State University, 21 pages (Russian w/ English translation), 2016.

Russian Office Action, Application No. 2023107533, 25 pages, Sep. 18, 2023.

Russian Office Action, Application No. 2023107533, 16 pages, Feb. 16, 2024.

Search Report for International Application No. PCT/EP2021/073655, 12 pages, Dec. 10, 2021.

* cited by examiner

POWDER COATING FORMULATION FOR AN INSULATION SYSTEM OF AN ELECTRIC MACHINE

CROSS-REFERENCE TO RELATED APPLICATIONS

This application is a U.S. National Stage Application of International Application No. PCT/EP2021/073655 filed Aug. 26, 2021, which designates the United States of America, and claims priority to DE Application No. 10 2020 211 111.1 filed Sep. 3, 2020, the contents of which are hereby incorporated by reference in their entirety.

TECHNICAL FIELD

The present disclosure relates to electric machines. Various embodiments of the teachings herein include powder coating formulations for an insulation system of an electrical machine, e.g., a rotating electrical machine having a rated voltage of at least 500 V to 700 V.

BACKGROUND

More and more powerful electrical machines, such as generators, are being developed, since the industry as it progresses calls for ever-higher power densities. A powerful generator, such as a turbogenerator, for example, comprises a stator having a laminated stator core and a plurality of generator grooves in which the insulation system is located, generally in the form of windings. In principle, beyond a rated voltage of 1000 V, a wound insulation is employed; in the case of electrical machines below 1000 V, as in the case of traction motors, for example, groove-insert insulations are employed.

The insulation system is key to the reliability, safety and efficiency of an electrical machine, as for example of a generator for the rated voltage range of at least 500 V, more particularly at least 700 V, up into the high-voltage range. This concerns the low-voltage range just as the high-voltage range of more than 52 kV.

During the operation of such machines, field strengths within the insulation system of several kV/mm are not uncommon. The stress on the insulation system is correspondingly great. The insulation system of generators, based on mica tapes with epoxy resin impregnation, for example, provides for the insulation of the one or more conductors, which are subject to high voltage, with respect to the grounded stator. The system possesses a high partial discharge inception voltage, so enabling it to durably take down up to 3.5 kV per millimeter or more.

Presently known formulations based on resin for producing insulation systems frequently comprise fillers having a high specific surface area, as well as a curable resin formulation based, for example, on epoxy. Depending on usage, further additives may be added, examples being initiators and/or accelerator substances which have an initiating effect on the curing of an applied impregnating and/or powder coating formulation to form a solid insulation system. An impregnating formulation is substantially liquid, whereas a powder coating formulation is a powdery mixture in the form of a mixture of solids. A filler used in both cases in accordance with the prior art, for example, is mica, since as a particulate and more particularly platelet-shaped inorganic barrier material, it has good chemical and thermal stability and is able to retard the electrical erosion under electrical partial discharges effectively and durably, preferably over the entire lifetime of the machine or of the generator.

The known fillers, however, produce a considerable increase in the viscosity of the formulations. Where, however, a formulation for producing an insulating system, whether by spraying, immersion in a fluidized bed, coating and/or impregnation with a liquid, has a high viscosity, this results in poor degassability, meaning that pores, more particularly air-filled pores, may develop in the cured insulation system. It has emerged that a pore-free insulation system is important for the electrical lifetime of the electrical machines in question here. Air possesses a relatively low dielectric strength, and so partial discharges may occur even at relatively low field strengths. In the resin fraction of an insulation system, therefore, it is necessary to avoid air inclusions. The surface quality of formulations of high viscosity, which therefore exhibit pore leveling, is also deficient.

SUMMARY

The teachings of the present disclosure include a formulation, more particularly a powder coating formulation, which produces insulation systems having improved insulating properties, electrical machines having a correspondingly improved insulation system, and/or methods for producing an insulation system of an electrical machine. For example, some embodiments include a powder coating formulation suitable for producing an insulation system (12) of an electrical machine (10), more particularly of a rotating electrical machine (10) having a rated voltage of at least 700 V, comprising at least one curable resin mixture, characterized in that the powder coating formulation additionally comprises spherical $SiO_2$ filler particles having a maximum particle diameter of 100 μm.

In some embodiments, the powder coating formulation additionally comprises nonspherical $SiO_2$ filler particles, more particularly irregularly shaped $SiO_2$ filler particles.

In some embodiments, the filler particles are crystalline and/or amorphous.

In some embodiments, the $SiO_2$ filler particles comprise fused silica, quartz flour and/or quartz glass.

In some embodiments, the filler particles are present with a mass fraction of between 5 wt % and 65 wt %, more particularly between 40 wt % and 60 wt % based on the total mass of the powder coating formulation.

In some embodiments, the filler particles have a particle size distribution $D_{50}$ of between 1 μm and 50 μm, more particularly between 2 μm and 16 μm, and/or a maximum particle diameter of 70 μm, and/or a thermal expansion coefficient of at most $20*10^{-6}*K^{-1}$, more particularly of at most $1*10^{-6}*K^{-1}$, and/or a relative permittivity of between 1 and 7 at 18° C. and 50 Hz, more particularly between 2.5 and 4.5.

In some embodiments, the filler particles are at least partly surface-modified, more particularly silanized.

In some embodiments, the resin mixture, which is solid at room temperature, comprises a monomeric and/or oligomeric, more particularly epoxidized novolac blend with bisphenol A and/or bisphenol F diglycidyl ether, more particularly with chain-extended bisphenol A and/or F, a diepoxidic or higher polyepoxidic carbon-based resin component and/or a monomeric and/or oligomeric resin blend based on alkyl- and/or aryl-polysiloxane with at least one further resin component, preferably comprising two or more glycidyl ester and/or glycidyl ether and/or hydroxyl functionalities, and/or in that the powder coating formulation comprises at least one compound acting as curing agent and based on dicyandiamide and/or on (poly)amine and/or on amino-functional and/or alkoxy-functional alkyl-/aryl-polysiloxane.

In some embodiments, the powder coating formulation is configured as a sprayable powder coating material.

In some embodiments, in the cured state it possesses a thermal expansion coefficient of at most $40*10^{-6}*K^{-1}$.

As another example, some embodiments include an electrical machine (10), more particularly rotating electrical machine for the high-voltage or low-voltage range, comprising at least one conductor (8) and an insulation system (12) which comprises insulation components for insulating the conductor (8), characterized in that the insulation system (12) is obtained and/or obtainable at least partly by single or multiple application of a powder coating formulation as described herein to the insulation components, and subsequent curing.

As another example, some embodiments include a method for producing an insulation system (12) of an electrical machine (10), more particularly of a rotating electrical machine (10) for the high-voltage or low-voltage range, wherein a powder coating formulation as described herein is coated one or more times to insulation components which comprise a conductor (8) of the machine (10), and subsequently cured.

In some embodiments, the method comprises the steps of: a) producing a powder coating formulation as described herein, b) preparing a substrate by heating and/or electrical contacting, c) applying the powder coating formulation to the prepared substrate (8), more particularly spraying and/or immersing the substrate (8) in a fluidized bed of the powder coating formulation, d) melting, drying and/or partially gelling the powder coating formulation on the substrate (8), and e) curing the powder coating formulation to form the insulation system (12).

In some embodiments, steps c) and d) are repeated one or more times.

In some embodiments, the method is carried out at least partly automatically.

BRIEF DESCRIPTION OF THE DRAWINGS

Further features of the teachings herein are evident from the claims, the figures, and the description of the figures. The features and feature combinations stated above in the description, and also the features and feature combinations that are stated below in the description of the figures and/or which are shown in the figures alone, can be used not only in the particular combination indicated but also in other combinations as well, without departing from the scope of the disclosure. The scope of the disclosure includes embodiments which are not explicitly shown and explained in the figures but which are evident and can be generated through separate combinations of features from the embodiments explained. The disclosure is intended to include embodiments and feature combinations which therefore do not have all of the features of an originally formulated independent claim. Furthermore, the disclosure is to include embodiments and feature combinations, in particular as a result of the observations set out above, that go beyond or deviate from the feature combinations set out in the dependency references of the claims. In the figures:

DETAILED DESCRIPTION

Figure 1:
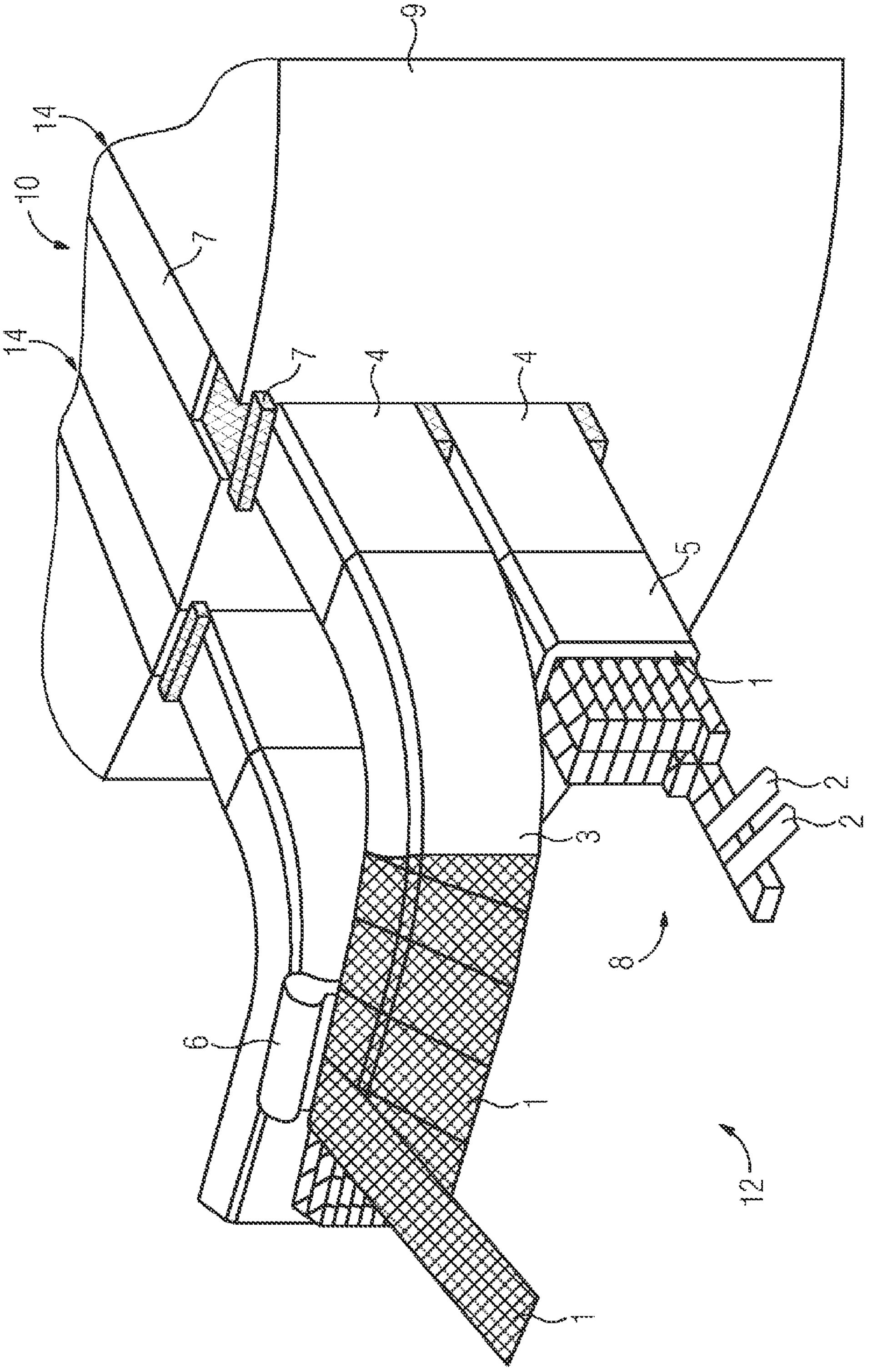
FIG. 1 shows a schematic view in section of a generator in the exit region of a winding comprising a laminated core incorporating teachings of the present disclosure.

The teachings of the present disclosure include a powder coating formulation comprising: a) resin mixture, b) curing agents, c) accelerators, d) filler, and e) additives. Some embodiments include at least one degassing additive and/or at least one leveling additive.

Some embodiments include a powder coating formulation for an insulation system of an electrical machine, more particularly of a rotating electrical machine for the high-voltage or low-voltage range, comprising at least one curable resin mixture, where the powder coating formulation additionally comprises spherical filler particles of silicon dioxide—$SiO_2$. In other words, round particles are provided as filler in the powder coating formulation. This enables the production of an insulation system having improved insulating properties, since round particles possess a significantly lower specific surface area by comparison with platelet-shaped fillers such as mica. As a result it is possible to introduce more filler into the powder coating formulation for a given viscosity or, conversely, to achieve a lower viscosity for a given filler content.

In some embodiments, the powder coating formulation is free from mica platelets. More filler in the powder coating formulation and/or a lower viscosity of the powder coating formulation lead/leads to improved application and degassing properties of the powder coating formulation and hence to better insulating properties, better and/or a higher surface quality of the resulting insulation system. Accordingly a very largely air inclusion-free and/or pore-free insulation system can be produced, having an extremely high filler concentration—with beneficial consequences as well for the matching of the respective thermal expansion coefficients.

The epoxy resin conventionally present in liquid form is replaced by solid, not by crystallites. Crystallinity in the resin would drive up the costs of the formulation without producing any improvement, since the purity required by crystallites is destroyed again in any case by the addition of filler.

In some embodiments, the powder coating formulation additionally comprises nonspherical filler particles, more particularly irregularly shaped filler particles and/or platelet-shaped filler particles, more particularly having a form factor of between 1 to 3, but in certain circumstances even greater than 10. In other words, a portion of the filler particles in the powder coating formulation have a shape which is not spherical or primarily round, but instead are irregular and/or platelet-shaped in form. The "form factor" as used here is a measure of the ratio of particle diameter to particle thickness for a population of particles of different size and shape, and may be ascertained for example with the methods, apparatus and equations described in U.S. Pat. No. 5,576,617. The higher the form factor, the more platelet-shaped—that is, flatter and more elongated—the particles. The form factor may for example be 60, 90, 120 or more. In this way it is possible to adapt the rheological properties of the powder coating formulation and also the electrical insulating properties of the insulation system produced from it to the particular end use in an optimal way.

In some embodiments, the filler particles are dielectric and/or crystalline and/or amorphous. With filler particles that are electrically nonconducting, a correspondingly good insulating property is ensured. Through the use of crystalline and/or amorphous filler particles it is possible to adjust the rheological properties of the powder coating formulation and its degassing properties.

In some embodiments, the $SiO_2$ filler particles comprise quartz flour, fused silica and/or quartz glass. Fused silica and/or quartz glass are/is produced synthetically as an amorphous modification of quartz. The material possesses a series of advantageous properties, more particularly a very low thermal linear expansion coefficient ($0.5*10^{-6}*K^{-1}$) and also an outstanding elasticity and stability to temperature change. It also exhibits a high transformation temperature and softening temperature and a low thermal conductivity. While spherical fused silica is more expensive than non-spherical fused silica, it nevertheless, as already mentioned, possesses a significantly lower specific surface area and therefore enables the realization of the advantages stated above. One commercially available filler which possesses these properties is the BRUCAFIL® 1431 Quarzgut product from HPF Quarzwerke GmbH, Frechen, Germany. Quartz glass likewise possesses a high chemical stability, a high softening temperature and temperature stability, and also a low thermal expansion in conjunction with high stability to changing temperatures. Silicon dioxide is generally very resistant in the face of electrical discharges, and under very strong discharges may even soften and form a kind of protective layer against electrical discharges.

In some embodiments, the spherical or approximately spherical filler particles are present with a mass fraction of between 5 wt % and 70 wt %, more particularly between 30 wt % and 65 wt %, more particularly between 40 wt % and 60 wt %, based on the total mass of the powder coating formulation. In this way as well it is possible to adjust the rheological properties of the powder coating formulation and its degassing properties optimally to the particular end use. In some embodiments, at least 30% of all the filler particles are spherical, more particularly at least 50%, at least 75%, and more particularly at least 80%.

In some embodiments, the filler particles have a particle size distribution $D_{50}$ of between 1 μm and 50 μm, more particularly between 3 μm and 7 μm, and/or a maximum particle diameter of 100 μm, more particularly of 50 μm and/or a linear expansion coefficient of at most $20*10^{-6}*K^{-1}$, more particularly of at most $0.5*10^{-6}*K^{-1}$, and/or a relative permittivity of between 1 and 7 at 18° C. and 50 Hz, more particularly between 3 and 4.5. As a result of a low linear expansion coefficient, such as a thermal expansion of 0.5*10^−6/K, for example, the thermal expansion coefficient realized in the insulation system can be lower in many cases than that of the resin component. Depending on the concentration of filler in the powder coating formulation, therefore, the linear thermal expansion coefficient of the overall powder coating formulation can be considerably reduced. With a permittivity of between 1 and 7, 3.7 for example, the filler possesses almost the same permittivity as customary resins—which can be stated at around 3.5—and therefore provides for virtually no field boosting in the insulation system. The $D_{50}$ of the filler particles is preferably between about 30% and about 100% of the thickness of the later insulation system. The size of the filler particles is preferably such that they can be applied by a spraying nozzle, with or without compressed air.

In some embodiments, the filler particles are at least partially surface-modified, more particularly silanized. In this way it is possible to improve the attachment of the filler to the resin and at the same time its processing properties. Such a surface modification may be realized, for example, with silanes, and hence the filler surface may be epoxy-functionalized, amine-functionalized, vinyl-functionalized, etc., and hence the filler particles may be attached covalently to the resin matrix.

The resin mixture of the sprayable—i.e., as yet uncured—powder coating formulation generally comprises at least one monomeric and/or oligomeric, optionally chain-extended, thermosetting resin component, more particularly an epoxy resin component. The resin mixture cures to form the resin basis of the filled insulation system. Suitable for this purpose, for example, are novolacs, bisphenol A and/or bisphenol F diglycidyl ethers, which for example may also be present in chain-extended form.

In some embodiments, the resin mixture is solid at room temperature and comprises a monomeric and/or oligomeric, more particularly epoxidized novolac blend with bisphenol A and/or bisphenol F diglycidyl ether, more particularly with chain-extended bisphenol A and/or F, a diepoxidic or higher polyepoxidic, carbon-based resin component and/or a monomeric and/or oligomeric resin blend based on alkyl- and/or aryl-polysiloxane with at least one further component, all of the epoxy resin components preferably comprising two or more glycidyl ester and/or glycidyl ether and/or hydroxyl functionalities, and/or where the resin mixture comprises at least one compound which acts as curing agent and is based on dicyandiamide and/or on (poly)amine and/or on amino-functional and/or on alkoxy-functional alkyl-/aryl-polysiloxane.

Suitable "curing agents" accordingly are compounds based on dicyandiamide and/or on (poly)amine and/or on amino-functional and/or on alkoxy-functional alkyl-/aryl-polysiloxane.

"Additives" as used herein are compounds which are taken for degassing, for improved leveling and/or for preventing cratering in powder coatings. These additives may be additives based, for example, on benzoin, polyester, acrylate and/or modified wax. For example, these compounds may also be present in adsorbed form on silicon dioxide in the additive.

"Accelerators" or "catalysts" may include urons, such as fenuron and/or monuron, for example. These accelerators dissociate under introduction of temperature to form isocyanate and dimethylamine.

The term "chain-extended" is applied to monomers or oligomers—for example, those of bisphenol A diglycidyl ether or BADGE or DGEBA. For the repeating units which are shown in a structural formula as below, placed in parentheses, for example, n is then greater than zero.

In some embodiments, the mixtures and compounds are present in solid form at room temperature and under standard conditions, i.e., atmospheric pressure, etc. There is fundamentally no economic rationale for using liquids for producing powder coating materials.

A "powder coating formulation" here is the uncured mixture, which is nevertheless present in solid form and sprayable, whereas the mixture applied to the substrate is referred to as a "powder coating material".

The chain extension of the resin basis which can be used here and which is solid at room temperature, i.e., is present in solid form, comprising, in particular, DGEBA-based epoxy resins, is not to be equated with the curing and/or crosslinking of the resin to form the thermoset. The already chain-extended epoxy resins are incorporated as solids into the powder coating formulation. The chain-extended solid epoxy resins are characterized for example by repeat units containing secondary hydroxyl groups. In theory there are linear skeletons present, i.e., backbones of polymers having two terminal oxirane-ring groups, with repeat units between them, of n=2 to n=35, for example, which carry secondary hydroxyl groups, as shown in formula I:

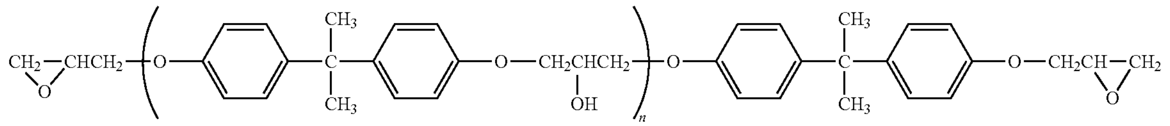

In some embodiments, the resin mixture comprises a further monomeric and/or oligomeric, more particularly diepoxidic or higher polyepoxidic, carbon-based and/or siloxane-based resin component. After curing, the resin basis then present has a backbone of the polymerically crosslinked compound that contains not only hydrocarbons but also $—[SiR_2—O]_n—$ units.

In some embodiments, the resin mixture comprises a monomeric and/or oligomeric resin component based on alkyl- and/or aryl-polysiloxane in a blend with at least one, preferably two or more, glycidyl ester and/or glycidyl ether functionalities and/or for the resin mixture to comprise at least one compound which acts as curing agent and is based on anhydride and/or on (poly)amine and/or on amino-functional and/or on alkoxy-functional alkyl-/aryl-polysiloxane.

In some embodiments, the resin mixture and/or resin-curing agent mixture for the insulation material is a resin and/or resin mixture wherein at least a portion of the resin mixture and/or resin-curing agent mixture curing to a thermoset for the insulation system is a siloxane-containing compound which in the fully cured thermoset forms an $—[SiR_2—O]_n—$ backbone.

In this formula, "R" stands for all kinds of organic radicals suitable for curing and/or crosslinking to give an insulating material which can be used for an insulation system. More particularly R stands for -aryl, -alkyl, -heterocycles, nitrogen-oxygen- and/or sulfur-substituted aryls and/or alkyls.

More particularly R may be identical or nonidentical and stand for the following groups:

- alkyl, as for example -methyl, -propyl, -isopropyl, -butyl, -isobutyl, -tert-butyl, -pentyl, -isopentyl, -cyclopentyl and also all further analogs up to dodecyl, i.e., the homolog having 12 C atoms;
- aryl, as for example: benzyl-, benzoyl-, biphenyl-, tolyl-, xylenes and also comparable aromatics, more particularly, for example, all aryl radicals having one or more rings whose construction corresponds to the Hückel definition of aromaticity,
- heterocycles: in particular, sulfur-containing heterocycles such as thiophene, tetrahydrothiophene, 1,4-thioxane and homologs and/or derivatives thereof,
- oxygen-containing heterocycles, such as, e.g., dioxanes,
- nitrogen-containing heterocycles, such as, e.g., those having —CN, —CNO, —CNS, —N3 (azide) substituents on the ring or on the rings, and
- sulfur-substituted aryls and/or alkyls: e.g., thiophene, but also thiols.

The Hückel rule for aromatic compounds relates to the fact that planar molecules with cyclic through-conjugation that comprise a number of Π electrons that may be represented in the form of 4n+2 possess a particular stability, which is also referred to as aromaticity.

In some embodiments, the resin mixture and/or resin-curing agent mixture, as well as the monomeric and/or oligomeric component which is functionalized for the polymerization and which has a $—[SiR_2—O]_n—$ backbone, also comprises at least one monomeric or oligomeric resin component which is functionalized for the polymerization and has a backbone comprising carbon—i.e., comprising $—[—CR_1R_2—]_n—$ units. In this formula, R stands for -hydrogen, -aryl, -alkyl, -heterocycles, nitrogen-, oxygen- and/or sulfur-substituted aryls and/or alkyls. Suitable more particularly, for example, are epoxide-functionalized components, such as bisphenol F diglycidyl ether (BFDGE) or bisphenol A diglycidyl ether (BADGE), polyurethane, and also mixtures thereof, e.g., epoxy resins based on bisphenol F diglycidyl ether (BFDGE), bisphenol A diglycidyl ether (BADGE) or mixtures thereof.

For example, the monomeric or oligomeric component which is functionalized for the polymerization and which has an $—[SiR_2—O]_n—$ backbone is combined with one or more components containing $—[—CR_1R_2—]_n—$ backbone, selected from the group of the following compounds, to form the resin mixture and/or resin-curing agent mixture: Undistilled and/or distilled, optionally reactively-diluted bisphenol A diglycidyl ether, undistilled and/or distilled, optionally reactively diluted bisphenol F diglycidyl ether, hydrogenated bisphenol A diglycidyl ether and/or hydrogenated bisphenol F diglycidyl ether, pure and/or blended epoxy-novolac and/or epoxy-phenol-novolac, cycloaliphatic epoxy resins such as 3,4-epoxycyclohexylmethyl 3,4-epoxycyclohexylcarboxylate, e.g., CY179, ERL-4221; Celloxide 2021P, bis(3,4-epoxycyclohexylmethyl) adipate, e.g., ERL-4299; Celloxide 2081, vinylcyclohexene diepoxide, e.g., ERL-4206; Celloxide 2000, 2-(3,4-epoxycyclohexyl-5,5-spiro-3,4-epoxy)cyclohexane-meta-dioxane, e.g., ERL-4234; diglycidyl hexahydrophthalate, e.g., CY184, EPalloy 5200; tetrahydrophthalic acid diglycidyl ether, e.g., CY192; glycidated amino resins (N,N-diglycidyl-para-glycidyloxyaniline, e.g., MY0500, MY0510, N,N-diglycidyl-meta-glycidyloxyaniline, e.g., MY0600, MY0610, N,N,N',N'-tetraglycidyl-4,4'-methylenedianiline, e.g., MY720, MY721, MY725, and also any desired mixtures of the aforesaid compounds.

Suitable monomeric or oligomeric components functionalized for the polymerization and having an $—[SiR_2—O—]_n$ backbone include glycidyl-based and/or epoxy-terminated aryl- and/or alkyl-siloxanes, such as, for example, glycidoxy-functionalized, especially glycidoxy-terminated siloxanes. Suitable for example accordingly is a siloxane such as 1,3-bis(3-glycidyloxypropyl)tetramethyldisiloxane, DGTMS, and/or glycidoxy-terminated phenyl-dimethylsiloxane and/or phenyl-methylsiloxane in monomeric and/or in oligomeric form, and also in any desired mixtures and/or in the form of derivatives. Instead of the 4 methyl substituents on the silicon in the DGTMS, it is possible for there to be different, identical or nonidentical alkyl and/or aryl substituents as desired. One of these components already tested is commercialized as "Silres® HP® 1250®". It has emerged that siloxanes with at least twofold functionalization that can be employed for the production of thermosets are suitable here.

Offered commercially for example is the following compound suitable as siloxane-based component, available commercially from Wacker AG:

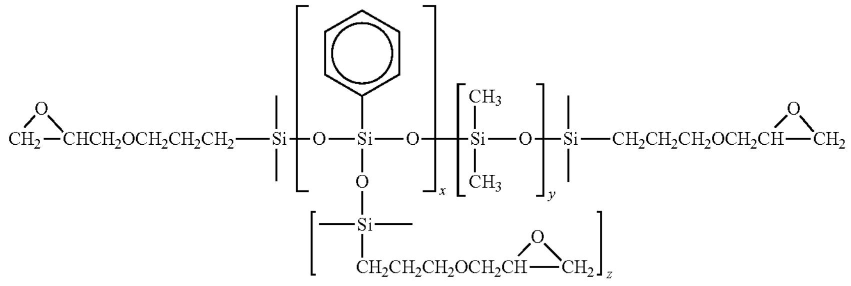

Suitable curing agents in the case of homopolymerization are cationic and anionic curing catalysts, such as, for example, organic salts, such as organic ammonium, sulfonium, iodonium, phosphonium and/or imidazolium salts, and amines, such as tertiary amines, pyrazoles and/or imidazole compounds. Illustrative instances here include 4,5-dihydroxymethyl-2-phenylimidazole and/or 2-phenyl-4-methyl-5-hydroxymethylimidazole. Use may also be made, however, of compounds containing oxirane groups, such as glycidyl ethers, for example, as curing agents. Just like the base resin, the curing agent as well may be replaced wholly or partly, alternatively or on a supplementary basis, by a compound with $-[SiR_2-O-]_n-$ backbone, here also called siloxane-based compound.

In case of high polymers which are not homopolymerizing, and which crosslink by addition, for example, di- or trianhydride (derivatives) that are solid at room temperature may be useful as curing agents, such as the use, for example, of 3,3',4,4'-benzophenonetetracarboxylic dianhydride (BTDA, CAS No. 2421-28-5). For example, a phthalic anhydride derivative and/or a polyamine, and/or a product of Wacker AG, the alkyl- and/or aryl- and/or alkoxy-substituted Wacker HP 2000 or HP 2020.

Conventionally, acid anhydrides as well are employed successfully as curing agents in the insulation materials. However, their toxicology is now no longer entirely uncontroversial. There is therefore increased use being made of other curing agents, particularly those based on imidazole and/or pyrazole.

In some embodiments, there may be complete or partial replacement of the carbon-based curing agent by siloxane-based curing agents having the same functionalities. In the insulating material which comprises the cured base resin, a ratio of siloxane-based, "with $-[SiR_2-O-]_n-$ backbone" compound to carbon-based, "with $-[CR_1R_2-]_n-$ backbone" compound of 1:8 to 1:4 may be favorable; in other words, in the insulation material in question, the hydrocarbon-based compounds are present quantitatively four to eight times more than the compounds containing $-[SiR_2-O-]_n-$ backbone. These proportions are based on the stoichiometry, and are therefore molar percentages.

The siloxane-containing component is therefore present in an amount of 10 to 50 mol % in the resin basis, i.e., in the resin mixture and/or resin-curing agent mixture, of the powder coating formulation. In some embodiments, the amount of siloxane-containing component in the base resin is not more than 20 mol %, more particularly not more than 18 mol % and/or not more than 15 mol %.

It has been possible to recognize a reduced erosion volume in the case of 20-30% substitution of the conventional resin component. However, since the mechanical properties, evident clearly from the glass transition temperatures and/or from the storage moduli, of the plastic become poorer as substitution progresses, it is conducive to substitute as little $-[-CH_2-]_n-$ backbone as possible. In the case of around 20% substitution, the glass transition temperatures and the storage moduli of the resultant resin system are virtually identical with those of the conventional resin comprising only $-[-CH_2-]_n-$ backbone.

The partial discharge resistance of the insulating material is hugely increased by virtue of the presence of a certain amount of $-[SiR_2-O-]_n-$ forming monomers or oligomers in the base resin.

In some embodiments, a powder coating material as described herein may be applied either to a heated—hot—or to a cold substrate. The powder coating material may additionally be applied via an electrostatic process—in which, again, the substrate present may be hot or cold.

The powder coating material may be applied via immersion of the substrate in a fluidized bed filled with powder coating formulation.

The choice of the respective application method and the thickness of the layer of powder coating material applied vary from one usage case to another. A general rule is that the thinnest layers can be applied in the context of electrostatic spraying onto a cold substrate.

The substrates in question here are, in particular, conductor elements that are already insulated from one another. Conductor elements are insulated from one another according to usage, by means, for example, of a woven glass fabric, a wrapping-tape insulation, mica insulation, a PET polyethylene terephthalate film, PI polyimide film and/or other conductor-element insulation variants.

In some embodiments, the respective conductor-element insulation is in the preconsolidated form of a prepreg. For example, two, a few or more or many conductor elements with conductor-element insulation from one another are baked to one another—in a hot press, for example. A packet of this kind is, for example, a substrate for application of the powder coating formulation. A powder coating "formulation" refers presently to the uncrosslinked form of the powder coating material, not yet applied to the substrate.

In some embodiments, the substrate has more of a rectangular than a rounded, oval or circular cross section. The powder coating formulation is applied to the substrate by spraying, for example—with or without compressed air—and/or by immersion in a fluidized bed with powder coating formulation. The cross section for example may be rectangular, in which case the conductor elements in the substrate are present in the form of flat wires. These conductor elements are "baked together" via their conductor-element insulation.

In the case of application to a hot substrate, said substrate is preheated for example to 130° C., to 150° C. or to 200° C., depending on usage and also depending on the heat class resistance of the substrate surface, the powder coating formulation, the conductor-element insulation and—last but not least—of the prepreg composed of a baked-together bundle of conductor elements insulated from one another.

An electrostatic adhesion of the powder coating material to the substrate, the surface of which, indeed, forms the conductor-element insulation and is therefore insulating, still takes place here via the electrical field of the conductor elements, since the electrical field goes through the conductor-element insulation.

When the cold or heated and/or electrically contacted substrate is immersed in a fluidized bed, a respective layer of powder coating formulation attaches to the surface of the substrate. This layer is partially melted and/or partially gelled either electrically or by temperature or by both. The partially melted and/or partially gelled powder coating material then sticks to the substrate. The immersion may take place automatically or at least partly automatically.

In some embodiments, the powder coating formulation is configured as a sprayable powder coating formulation. In this way, again, an automatic or at least partly automatic application is possible, thereby allowing corresponding time and cost savings to be made.

In some embodiments, a layer of the completed insulation system that is produced by spraying has a thickness in the range from 50 μm to 150 μm, 50 μm to 130 μm, and/or from 70 μm to 120 μm. In the case of electrical rotating machines, insulation thicknesses in the range from 700 μm to about 6 mm, more particularly from 1.5 mm to 2.5 mm, of insulation thickness are frequently needed, and so the sprayed insulation systems are applied in multiple layers—for example, up to 30 layers, more particularly up to 20 layers. One to three layers in the case of small machines up to 20 layers in the case of large electrical machines are applied, for example.

For the application of the second and further layers of powder coating formulation, the substrate is of course the first layer of powder coating material; the lower layer of powder coating material may be at least already degassed and/or partially gelled, to provide a homogeneous surface as a substrate for the upper layers.

In some embodiments, the entire powder coating formulation and insulation produced from it possess a linear expansion coefficient of at most $35*10^{-6}*K^{-1}$. The winding of electrical machines is typically produced from copper. The resin binder of the insulation system generally possesses a thermal expansion which is at least four times higher than that of copper. By adding a filler having a low thermal expansion, it is possible to significantly reduce the thermal expansion of the insulation and to shift it in the direction of the copper. Similar thermal expansion coefficients between winding and insulation ensure a stable attachment of the insulation system to the copper winding under fluctuating thermal loads, by reducing thermally induced stresses. The same is true for other metals and metal alloys.

In some embodiments, an electrical machine, more particularly a rotating electrical machine, comprises at least one bundle of conductor elements and an insulation system which comprises insulation components for the insulation, where the insulation system is obtained and/or obtainable at least partly by single or multiple application of a powder coating formulation as described herein, and subsequent curing.

As a result of this, the electrical machine, which may for example be a generator, possesses an insulation system which is correspondingly improved relative to the prior art with platelet-shaped—mica—fillers, because round and/or approximately round filler particles possess a significantly lower specific surface area by comparison with platelet-shaped fillers such as mica. As a result it is possible to put more filler into the powder coating formulation for a given viscosity, or, conversely, to achieve a lower viscosity for a given filler content. More filler in the powder coating formulation or in the insulation system produced from it, and/or a lower viscosity of the powder coating formulation, lead/leads to improved application and degassing properties in the course of application, adhesion to the substrate and the curing of the powder coating formulation, and hence to better insulating properties and a higher surface quality of the resultant insulation system. It is therefore possible to produce a virtually pore-free insulation system having an extremely high filler concentration. Further features and their advantages are apparent from the descriptions of the first aspect of the invention.

In some embodiments, a method for producing an insulation system of an electrical machine, more particularly of a rotating electrical machine produces an insulation system with round filler particles possessing a significantly lower specific surface area by comparison with platelet-shaped fillers such as mica. As a result it is possible to put more filler into the powder coating formulation for a given viscosity, or, conversely, to achieve a lower viscosity for a given filler content. More filler in the powder coating formulation and/or a lower viscosity of the powder coating formulation lead/leads to improved application and degassing properties of the powder coating formulation and hence to better insulating properties and a higher surface quality of the resultant insulation system. It is therefore possible to produce a pore-free insulation system having an extremely high filler concentration. Further features and their advantages are apparent from the descriptions of the first aspect of the invention.

In some embodiments, the method comprises: a) producing a powder coating formulation as described herein, b) preparing a substrate by heating and/or electrically contacting, c) applying the powder coating formulation to the prepared substrate, more particularly spraying and/or immersion of the substrate in a fluidized bed of the powder coating formulation, d) melting, drying and/or partially gelling the powder coating material on the substrate, and e) curing the powder coating material to form the insulation system.

In some embodiments, one of the polymerizable resin components of the resin mixture comprises a thermoset.

In some embodiments, the powder coating formulation is sprayed by means of a nozzle onto a conductor in order to give the insulation system. In general, the spherical fillers produce a low abrasiveness.

In some embodiments, steps c) and d) are repeated one or more times. As a result it is possible to produce correspondingly thicker insulating layers.

In some embodiments, the method is carried out at least partly automatically. A sprayed powder coating formulation in particular, for producing a main insulation in particular, enables partly or fully automated production even of insulation systems that are individually adapted to the particular machine.

Furthermore, the powder coating formulation and spraying or fluidized bed technology enable an increase in the power density of electrically rotating machines, on the assumption that the insulation system produced by a powder coating material has the same electrical lifetime as a conventional insulation system. The latter, compared therewith, comprises a very large number of components and necessitates a large number of operating steps with wrapping tape comprising corona shielding tape, tape adhesives, tape accelerators, in certain circumstances manually applied wrapping, with subsequent resin impregnation, optionally at elevated temperature with superatmospheric pressure or reduced pressure, and through-curing of the resin to conclude.

FIG. 1 shows a schematic view in section of an electrically rotating machine 10, embodied by way of example as a generator, in the exit region of a conductor or of a winding composed of mutually insulated conductor elements 8 from a laminated core 9. Electrically rotating machines possess a very high efficiency of up to 99.5%. The insulation components of the generator 10 comprise a main insulation 1, which can be produced from application of a powder coating formulation by curing, and a conductor-element insulation 2, which can be produced by winding. While the conductor-element insulation 2 is embodied as a wrapping-tape insulation, the main insulation 1 here is a pure coating, which can be produced via single or multiple application and curing of the powder coating formulation incorporating teachings of the present disclosure.

Also apparent in FIG. 1 is an outer corona shield 4. The generator 10 additionally comprises a fixing tape 5, a fixing strip 7, the winding of the mutually insulated conductor elements 8, and the laminated core 9.

An insulation system 12 is key to the reliability, safety and efficiency of the generator 10. The main insulation 1 of the generator is based, for example, on powder coating material composed of a resin mixture, which comprises chain-extended bisphenol A, which is filled with spherical and fused silica-based filler in an amount of 55 wt %, based on the total mass of the powder coating formulation, and provides for the insulation of the conductors in the form of copper conductor 8 relative to the grounded stator, the laminated core 9.

The main insulation possesses a high partial discharge inception voltage, which allows it to durably take down 3.5 kV per millimeter. Air possesses a relatively low dielectric strength, and hence partial discharges may occur even at relatively low field strengths. Accordingly, via the methods described herein for applying the powder coating formulation, air inclusions, in particular in the main insulation 1, are prevented as effectively as possible.

The constituents of the present insulation system 12, considered from the inside outward, comprise the copper conductors (or conductor elements) 8, i.e., the electrical coil, which are compressed with one another to form what are called Roebel bars—in the prepreg stage; optionally an internal potential controller (IPC; not shown) applied to the bars; the main insulation 1; and the outer corona shield 4 (OCS) thereon. The generator winding or motor winding leaves the generator grooves 14 at each of the end faces of the laminated core 9. At these points, what is called a terminal corona shield (TCS)—not shown here—is applied on the four OCS subsequently, in order to control the electrical potential, in other words to raise the potential over the length of the TCS. All of these constituents of the insulation system 12 (IPC, main insulation 1, OCS 4 and TCS) are, in accordance with the prior art, wrapped predominantly as tapes onto the conductor elements 8—here, application is carried out, for example, manually or at most semi-automatically.

A bundle 8 of insulated conductor elements is baked—by means of a hot press, for example—to form a prepreg. The bundle 8 is, for example, a "substrate" in the sense of the disclosure, to which the powder coating formulation is applied; that is, the powder coating formulation is coated, i.e., covered, either by immersion in a fluidized bed of powder coating material and/or spraying, "powdering" with powder coating formulation. Because the substrate either is hot and/or is electrostatically charged, the powder coating formulation sticks to it in at least one layer, either via partial melting, because the substrate is at 150° C. or 200° C., and/or via electrostatic adhesion.

This first layer is then partially gelled and partially cured to a point allowing it to serve as the substrate for the second layer, again composed of powder coating formulation applied, for example, by spraying.

Figure 2:
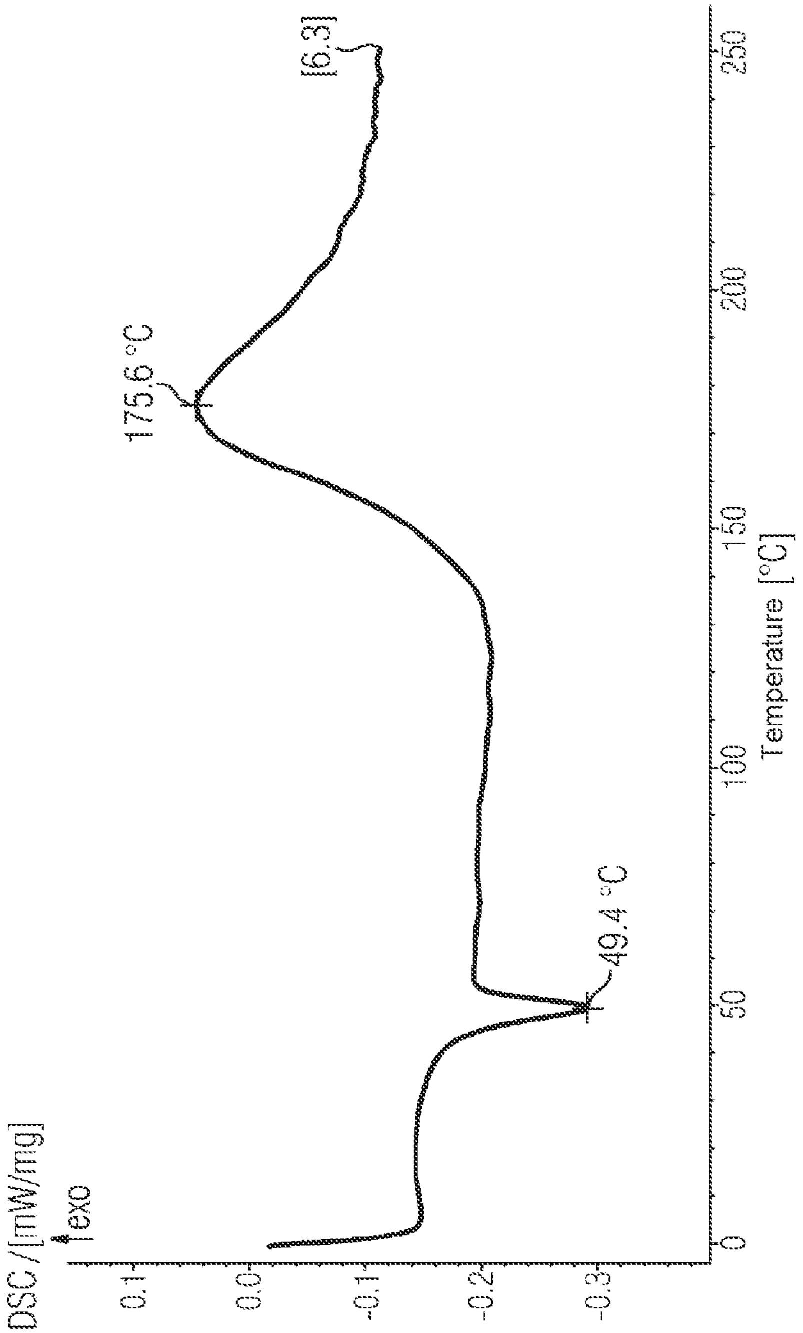
FIG. 2 shows a DSC measurement of the resin mixture solid at room temperature.

FIG. 2 shows a DSC measurement, i.e., a differential scanning calorimetry measurement, in which the sample undergoes heating at a particular measurement rate and a measurement is made of how the heating of the sample actually leads to an increase in the temperature or whether, for example, the heating in the sample is consumed by the melting energy of the solid and there is therefore no increase in sample temperature in spite of continued heating.

In the present case, the measurement was carried out with a perforated aluminum crucible of 0 mg as reference; the sample of powder coating formulation itself weighed 6.98 mg. The measurement was carried out from 0 to 250° C._10K_min_2times/30-11-2020 15:21 μm Segments:3/6; crucible: Pan AL, pierced lid; atmosphere: N2, 20.0 ml/min./. N2, 70 ml/min; correction measurement/range: 020/5000 μV. The diagram, FIG. 2 respectively, was generated using NETZSCH Proteus software.

Represented in FIG. 2 is a DSC measurement of an illustrative resin mixture present in solid form at room temperature, as may be employed presently in the powder coating formulation. In some embodiments, a powder coating material of this kind comprises a resin mixture, curing agent, accelerator, additive and/or fillers.

In the measurement shown here, the mixture measured was as follows: Completed powder coating material, comprising:

f) resin mixture: here: epoxidized novolac, chain-extended DGEBA and polysiloxane
g) curing agent: dicyandiamide
h) accelerator: uron
i) filler: spherical fused silica
j) additives: degassing additive: benzoin leveling additive: acrylate It is therefore not possible to produce a high-crystallinity material from this mixture, because the chain lengths and the different polarities of the various molecules are unable to form crystalline regions. Moreover, amorphous structures are formed preferentially when the rate of cooling during the production operation is selected at a high level.

In conventional powder coating material production, for example, a very short dwell time of the reactive powder coating material mixture in the twin-screw extruder is desirable, followed by rapid cooling of the powder coating material melt, in order to suppress premature polymerization in the production process.

In particular, a powder coating material of this kind which is present in solid form at room temperature comprises a resin mixture with a monomeric and/or oligomeric, more particularly epoxidized novolac blend with bisphenol A and/or bisphenol F diglycidyl ether, more particularly with chain-extended bisphenol A and/or F, a diepoxidic or higher polyepoxidic, carbon-based resin component and/or a monomeric and/or oligomeric resin blend based on alkyl- and/or aryl-polysiloxane—for example again with at least one further resin component, e.g. comprising two or more glycidyl ester and/or glycidyl ether and/or hydroxyl functionalities.

The measurement was carried out on the unfilled powder coating material. It was carried out using a standardized instrument from NETZSCH, the NETZSCH DSC 204F1 Phoenix 240-12-0411-L; the parameters, as described above, are heating rate 10 K/min in the range from 0° C. to 250° C. A softening point at 49.4° C. is clearly apparent; at lower temperatures, the epoxy resin is solid. In the present case there is no pronounced crystallinity apparent in the form of a large enthalpy of fusion, because the presently employed epoxy resin mixture, which here is composed, for example, of DGEBA or BADGE—bisphenol A diglycidyl ether—in a blend with epoxidized novolac and siloxane, is present not in particular purity, and therefore with crystallinity, but instead as a mixture. The powder coating formulation displays a second, imprecise peak at 175.6° C.

The powder coating formulation represents one possibility for supplementing or else doing entirely without the conventional wrapping-tape insulation and/or the VPI—vacuum pressure impregnation—process. For this purpose, the insulating powder coating material, filled with spherical quartz, is applied in a laminar system of multiple layers, such as in 2 to 20 layers, for example, to the substrate, and cured. The individual layers of the powder coating formulation may for example be applied additively and therefore with (partial) automation.

Accordingly, in an optionally multi-layer coating system with a powdery powder coating formulation, a siloxane-modified epoxide filled with spherical particles is applied in powder form to the conductor-element winding 8. The siloxane here provides for a considerable extension to the electrical lifetime of the sprayed insulation system 12. As a result of the filling with primarily spherical particles, it is easy to accomplish degassing of the applied and possibly already partially gelled powder coating material.

It has emerged that a pore-free insulating layer is important for the electrical lifetime of the machine 10. Fillers having a high specific, surface area such as mica lead to a sharp increase in viscosity of the powder coating formulation. A high viscosity leads to poor degassing, and pores may consequently form in the cured insulation system 12. The surface quality of poorly leveling powder coating formulations, filled with platelet-shaped filler alone, is also deficient.

In some embodiments, therefore, the filler of the powder coating formulation for electrical insulation systems 12 that is used comprises a spherical compound such as, for example, spherical fused silica and/or spherical quartz glass. Spherical fused silica consists of round, amorphous $SiO_2$ beads. The amorphous silicon dioxide possesses a thermal expansion of $0.5*10^{-6}*K^{-1}$, which is about one hundred and twenty times lower than that of a suitable resin basis (for example, epoxy resin). Depending on the filler concentration in the curable resin mixture, therefore, the linear thermal expansion coefficient of the overall resulting insulation system 12 can be reduced. With a permittivity of 3.7, spherical fused silica possesses virtually the same permittivity as customary epoxy resins (around 3.5) and therefore ensures that there is virtually no field boosting in the insulation system 12. Silicon dioxide is resistant to electrical discharges and, under very strong discharges, may even soften and form a kind of protective layer with respect to electrical discharges (if the filler particles are small enough).

Spherical and/or approximately spherical fused silica, while more expensive than its non-spherical counterpart, nevertheless possesses a significantly lower specific surface area. As a result it is possible to put more filler into the powder coating formulation (powder coating material) for a given viscosity. More filler in the powder coating material can be equated with more positive effects of the filler on the powder coating material. A surface modification or surface coating of the spherical fused silica may improve the attachment of the filler to the resin formulation and at the same time optimize its processing properties. Such surface coating of the filler particles may typically be performed using silanes, so allowing the filler surface, as and when required, to be epoxy-functionalized, amine-functionalized, vinyl-functionalized, and so on. The surface can therefore be attached particularly well, covalently, to the respective resin matrix.

Typical filler concentrations lie between about 5 wt % and 65 wt %; preference is given to 40-55 wt %. Advantageous particle sizes $D_{50}$ lie between 1 μm and 30 μm, e.g. 3 μm and 7 μm. One commercially available filler which possesses these properties is BRUCAFIL® 1431 from HPF. The filler may be present as one fraction or in two or more fractions.

In general the filler used is electrically nonconducting, i.e., insulating. In addition to spherical, quasi-spherical and/or approximately spherical—thus, in principle, more round filler particles—it is possible in principle to provide filler particles which are different in shape, including, in particular, irregularly shaped particles. The filler particles may generally be present in crystalline and/or amorphous form.

The curable resin basis of the powder coating formulation may be realized as a copolymer of a siloxane with a chain-extended bisphenol A. In this way, with the aid of the powder coating formulation of the invention, a pore-free insulation system 12 can be realized, with a very high filler concentration.

The parameter values specified in the documents for defining operating conditions and measurement conditions for characterizing specific properties of the subject matter of the disclosure are considered to be encompassed by the scope thereof, including in the bounds of deviations—owing for example to measurement errors, system errors, weighing errors, DIN tolerances and the like.

What is claimed is:

1. A powder coating formulation suitable for producing an insulation system of an electrical machine, the formulation comprising:
- a curable resin mixture; and
- spherical SiO2 filler particles having a maximum particle diameter of 100 μm;
- wherein the spherical SiO2 filler particles are present with a mass fraction of between 5 wt % and 65 wt % based on the total mass of the powder coating formulation;
- wherein the resin mixture is solid at room temperature and comprises:
  - a monomeric and/or oligomeric blend;
  - an epoxidized novolac blend with bisphenol A and/or bisphenol F diglycidyl etherb;
  - a chain-extended bisphenol A and/or F;
  - a diepoxidic or higher polyepoxidic carbon-based resin component; and/or
  - a monomeric and/or oligomeric resin blend based on alkyl- and/or aryl-polysiloxane; and at least one further resin component comprising two or more glycidyl ester and/or glycidyl ether and/or hydroxyl functionalities; and/or at least one compound acting as curing agent and based on dicyandiamide and/or on (poly)amine and/or on amino-functional and/or alkoxy-functional alkyl-/aryl-polysiloxane.

2. The powder coating formulation of claim 1, further comprising nonspherical SiO2 filler particles.

3. The powder coating formulation of claim 1, wherein the filler particles are crystalline and/or amorphous.

4. The powder coating formulation of claim 1, wherein the SiO2 filler particles comprise fused silica, quartz flour, and/or quartz glass.

5. The powder coating formulation of claim 1, wherein the filler particles have a particle size distribution D50 of between 1 μm and 50 μm, and/or a maximum particle diameter of 70 μm, and/or a thermal expansion coefficient of at most 20*10−6*K−1, and/or a relative permittivity of between 1 and 7 at 18° C. and 50 Hz.

6. The powder coating formulation of claim 1, wherein the filler particles are at least partly surface-modified.

7. The powder coating formulation of claim 1, comprising a sprayable powder coating material.

8. The powder coating formulation of claim 1, wherein, in the cured state it possesses a thermal expansion coefficient of at most 40*10−6*K−1.

9. An electrical machine comprising:

a conductor; and an insulation system comprising a resin mixture filled with spherical SiO2 particles having a maximum particle diameter of 100 μm;

wherein the spherical SiO2 filler particles are present with a mass fraction of between 5 wt % and 65 wt % based on the total mass of the powder coating formulation;

wherein the resin mixture is solid at room temperature and comprises:

a monomeric and/or oligomeric blend;

an epoxidized novolac blend with bisphenol A and/or bisphenol F diglycidyl etherb;

a chain-extended bisphenol A and/or F;

a diepoxidic or higher polyepoxidic carbon-based resin component; and/or a monomeric and/or oligomeric resin blend based on alkyl- and/or aryl-polysiloxane; and at least one further resin component comprising two or more glycidyl ester and/or glycidyl ether and/or hydroxyl functionalities; and/or at least one compound acting as curing agent and based on dicyandiamide and/or on (poly)amine and/or on amino-functional and/or alkoxy-functional alkyl-/aryl-polysiloxane.

10. A method for producing an insulation system of an electrical machine, the method comprising:

coating insulation components with a powder coating formulation including a curable resin mixture filled with spherical SiO2 particles having a maximum particle diameter of 100 μm; and curing the formulation;

wherein the spherical SiO2 filler particles are present with a mass fraction of between 5 wt % and 65 wt % based on the total mass of the powder coating formulation;

wherein the resin mixture is solid at room temperature and comprises:

a monomeric and/or oligomeric blend;

an epoxidized novolac blend with bisphenol A and/or bisphenol F diglycidyl etherb;

a chain-extended bisphenol A and/or F;

a diepoxidic or higher polyepoxidic carbon-based resin component; and/or a monomeric and/or oligomeric resin blend based on alkyl- and/or aryl-polysiloxane; and at least one further resin component comprising two or more glycidyl ester and/or glycidyl ether and/or hydroxyl functionalities; and/or at least one compound acting as curing agent and based on dicyandiamide and/or on (poly)amine and/or on amino-functional and/or alkoxy-functional alkyl-/aryl-polysiloxane.

11. The method of claim 10, wherein coating the insulation components includes:

preparing a substrate by heating and/or electrical contact;

applying the powder coating formulation to the prepared substrate; and melting, drying, and/or partially gelling the powder coating formulation on the substrate.

12. The method of claim 11, wherein the powder coating formulation is applied and melted, dried, and/or partially gelled more than once.

13. The method of claim 10, carried out at least partly automatically.

* * * * *